United States Patent [19]
Harris

[11] Patent Number: 5,288,197
[45] Date of Patent: Feb. 22, 1994

[54] EQUIPMENT TRAILER

[76] Inventor: Wendell N. Harris, P.O. Box 462, Canyon, Tex. 79015

[21] Appl. No.: 831,560

[22] Filed: Feb. 5, 1992

[51] Int. Cl.$^5$ ............................................. B60P 1/34
[52] U.S. Cl. ............................ 414/495; 414/471; 414/482; 414/480; 280/43.24; 187/8.49
[58] Field of Search ............ 414/471, 480, 482, 495, 414/678; 280/43.24; 298/1 B, 17 B, 12, 25; 187/8.47, 8.49, 8.65, 8.74

[56]           References Cited
       U.S. PATENT DOCUMENTS

| | | | |
|---|---|---|---|
| 2,230,014 | 1/1941 | Raven | 414/495 X |
| 3,199,696 | 8/1965 | Chrysler et al. | 414/495 |
| 3,633,776 | 1/1972 | Moore | 414/495 |
| 3,724,697 | 4/1973 | Arvidsson | 414/495 |
| 3,790,013 | 2/1974 | Smith | 414/785 X |
| 4,348,054 | 9/1982 | Shonkwiler et al. | 414/471 X |
| 4,372,572 | 2/1983 | Verschage | 414/495 X |
| 4,673,328 | 6/1987 | Shiels | 414/471 |

*Primary Examiner*—Michael S. Huppert
*Assistant Examiner*—Stephen Gordon
*Attorney, Agent, or Firm*—Wendell Coffee

[57]           ABSTRACT

An equipment trailer particularly designed to transport as many as two forklifts at one time, having a trap door in the bed so that a forklift may be positioned on the trailer for maintenance to the lower portions of the forklift. The bed of the trailer is mounted within a U-shaped frame which has lifting mechanisms at the front and rear of the trailer to tilt the trailer bed as desired by the operator. The bed may be locked in a travel position to the arms of the U-shaped frame in such a way that excessive torque or longitudinal twisting couplings are not exerted upon the arms.

10 Claims, 4 Drawing Sheets

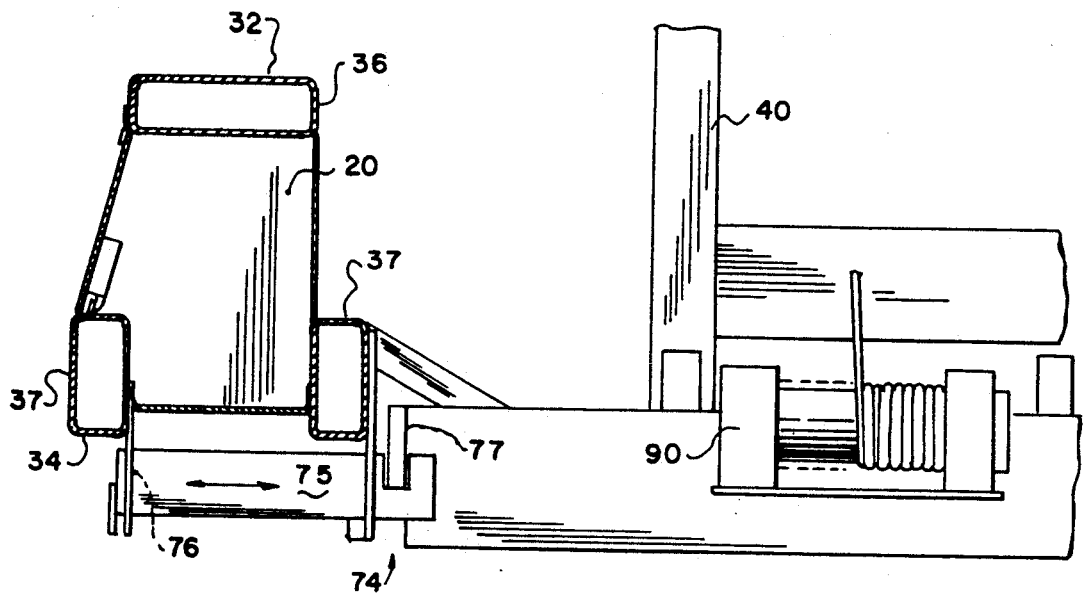
FIG-7
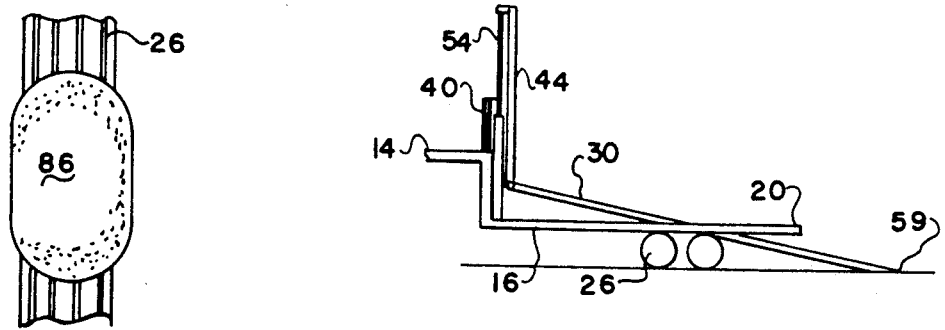
FIG-12
FIG-5
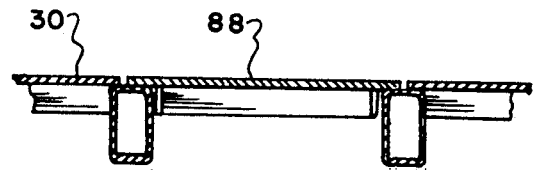
FIG-8

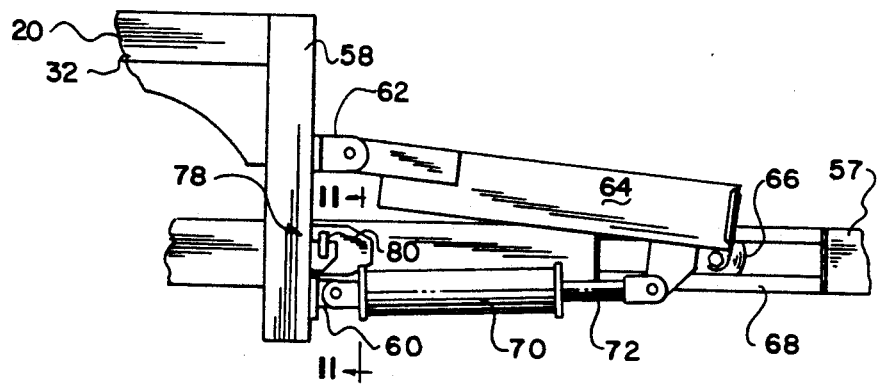
FIG-9
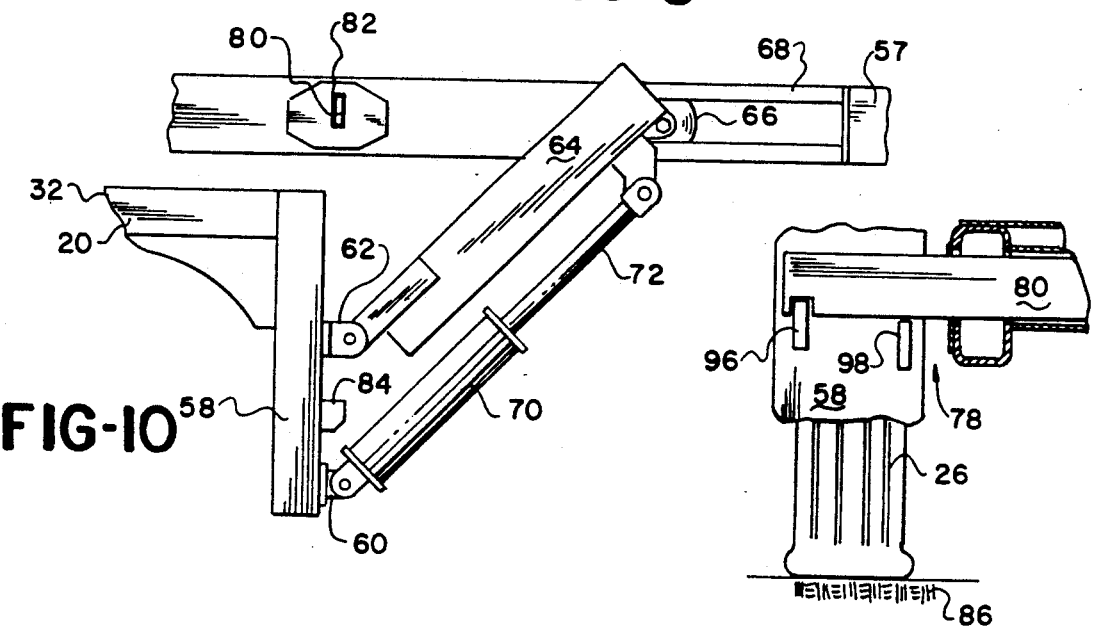
FIG-10
FIG-13
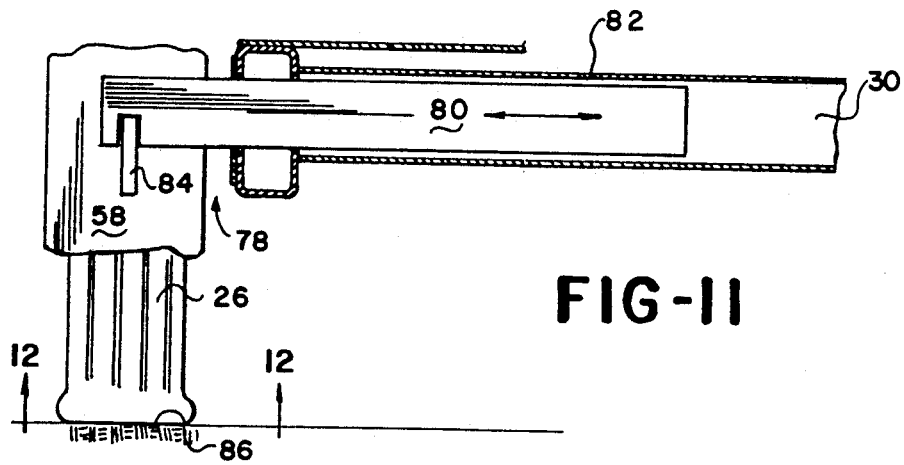
FIG-11

EQUIPMENT TRAILER

BACKGROUND OF THE INVENTION (1) Field of the Invention

This invention relates to a trailer particularly adapted to move heavy equipment such as forklifts.

(2) Description of the Related Art

Forklifts present a particular problem for transport, particularly those forklifts which are used for heavy warehouse work.

It is not unusual for these forklifts to weigh 20,000 lbs. Typically these forklifts will have extremely low clearance and will be extremely heavy.

Special trailers have been developed or adapted to move these particular vehicles. For example, the trailer built according to VERSCHAGE, U.S. Pat. No. 4,372,572, is used for this purpose. It is noted that the bed can be lowered so that it is very close to the ground in order that the fork lift may be driven onto the bed. The bed can then be elevated above the ground for transportation over the road. These forklifts are frequently used in warehouses which have loading docks elevated up to four or five feet above the roadway. Therefore it is desirable to have a vehicle where the bed may be elevated to such a height.

There is also the problem of performing repairs and maintenance upon forklifts unless a lift rack is available. Because of their extreme low clearance it is difficult, if not impossible, to perform even simple maintenance procedures such as changing a fan belt or draining used motor oil without placing them on a rack. As stated before, they are not mobile except on a level warehouse floor and therefore it is necessary to transport these vehicles to a shop with a rack or other location with special equipment before even such maintenance as discussed above can be performed.

SHIELS, U.S. Pat. No. 4,673,328, and RAVEN, U.S. Pat. No. 2,230,014, have disclosed trailers which can be lowered to ground level and elevated above ground level using a U-shaped frame. With a U-shaped frame there exists a problem of locking the bed for a proper height while transporting the load long distances. Also there is a problem of the U-shaped beams or arms spreading apart. A further problem is that the weight on the bed, suspended by the arms of the U-shaped frame, tends to twist the arms because the bed is usually attached at the inside of the frame and the wheels are attached to the outside of the frame. Since the arms extend from the bight of the U at the front of the trailer, this tends to twist the arms so that the wheels move outward.

SHIELS provides for the connection between the bed and the arms by the U-shaped frame which will hold the bed in a desired position and also prevent the arms of the frame from moving apart. However, SHIELS does not provide any solution for the twisting of the arms as the result of the torsion within the arms described above.

Before filing this application the applicant was aware of the following U.S. Patents and also Japanese Patent 244,731 issued in Japan in 1987.

| INVENTOR | PATENT NO. | ISSUE DATE |
| --- | --- | --- |
| JARMIN | 2,173,277 | 1939 |
| BIGDEN | 3,288,315 | 1966 |
| MARLETT | 4,702,662 | 1987 |
| LANDOLL | 5,013,056 | 1991 |

The above listed are mentioned here only because the applicant believes that an Examiner would be interested in anything reported by an experienced searcher.

SUMMARY OF THE INVENTION (1) Progressive Contribution to the Art

This invention solves these problems by providing a particular trailer with a U-shaped frame and a separate hydraulic lift mechanism at the front and at the back. It is possible to tilt the bed of the trailer relative to the frame. This has certain advantages. I.e., some loading docks are approached by sloping drive-ways or aprons, making it impossible to have the frame level when the trailer is backed against the loading dock. However, with the tilting bed the bed can be made level relative to the loading dock even though the frame may be tilted at a severe angle thereto. Also, in the event the forklift cannot move under its own power, the front of the bed may be lifted so that the fork lift will roll from the bed by gravity. To load an inoperable fork lift onto the trailer a cable winch is provided at the front so that the forklift may be attached to a cable and pulled up onto the trailer.

The bed of the trailer is provided with a trap door or removable plating in the floor of the trailer so that for simple maintenance as discussed above, the forklift can be positioned over the open trap door and with the bed elevated maintenance can be performed to the bottom of the forklift.

The trailer is designed to carry two forklifts. To prevent the twisting and spreading of the arms, lock means are provided so that the bed, in the road position, is suspended from the frame by having lock bars rest upon lugs which are positioned in line with the ground engaging wheels. Therefore the weight upon the wheels tends to be in line with the wheels preventing the torsional stress upon the arms and thereby preventing the arms from twisting or rotating about their longitudinal axis.

(2) Objects of this Invention

An object of this invention is to provide a trailer whose bed can be lowered to ground level or raised above ground level so that low-clearance equipment may be loaded onto it from the ground level or from a dock elevated above the ground.

Another object of this invention is to achieve the above with equipment which utilizes a U-shaped frame with reduced torsional strain upon the arms of the U-shaped equipment.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 5 is a side elevational schematic view of the trailer shown with the front of the bed elevated well above travel position and the back lip of the trailer on the ground.

FIG. 7 is a sectional elevational view taken substantially along line 7—7 of FIG. 6 showing the front locks of the frame and the cable winch upon the bed. The bed is shown in the transport position.

FIG. 8 is a sectional view of a part of the bed taken on line 8—8 of FIG. 4 showing the trap door.

FIG. 9 is a side elevational view of the rear elevating mechanism of the bed with the bed shown in the transport position.

FIG. 10 is similar to FIG. 9 showing the bed in an elevated position.

FIG. 11 is a sectional view taken substantially on line 11—11 of FIG. 9 showing the rear lock and particularly its relationship to the ground engaging wheel.

FIG. 12 is a bottom worm's-eye view taken substantially of 12—12 showing the contact area of the tire upon the ground.

FIG. 13 is a partial sectional view similar to FIG. 11 showing an alternate and preferred rear lock lugs.

As an aid to correlating the terms of the claims to the exemplary drawing(s), the following catalog of elements and steps is provided:

| 10 trailer | 58 pendant |
| 12 truck | 59 ramp lip |
| 14 hitch | 60 bottom pivot |
| 16 U-frame | 62 top pivot |
| 18 bight | 64 stiff arm |
| 20 arm | 66 roller |
| 22 jacks | 68 bed track |
| 24 rack | 70 pendant cylinder |
| 26 wheels, ground | 72 rod |
| 28 front of bed | 73 mid locks |
| 30 bed | 74 locks, front |
| 32 top | 75 bars |
| 34 bottom | 76 slots |
| 36 top stringer | 77 front lugs |
| 38 rear of arm | 78 lock |
| 40 guide rail frame | 80 bar |
| 42 rails | 82 slot |
| 44 moving frame | 84 lock ear |
| 46 pivot | 86 area |
| 48 guide arms | 88 trap plate |
| 50 guide wheels | 90 winch |
| 52 cylinder | 92 switches |
| 54 piston rod | 94 plug |
| 56 ear | 96 lug |
| 57 ramp | 98 lug |

DESCRIPTION OF THE PREFERRED EMBODIMENTS

Figure 1:
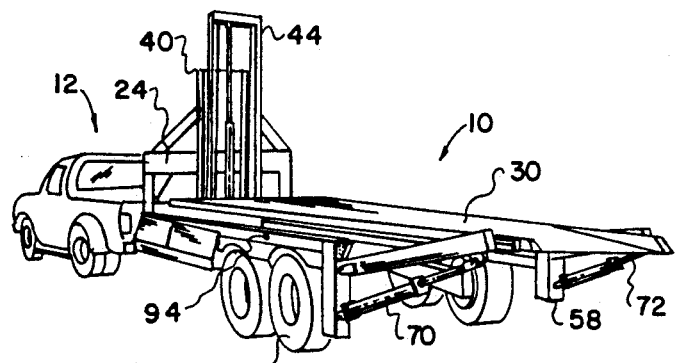
FIG. 1 is a rear perspective view of a trailer according to this invention attached to a truck. The bed of the trailer is shown in the partially raised position.
Figure 2:
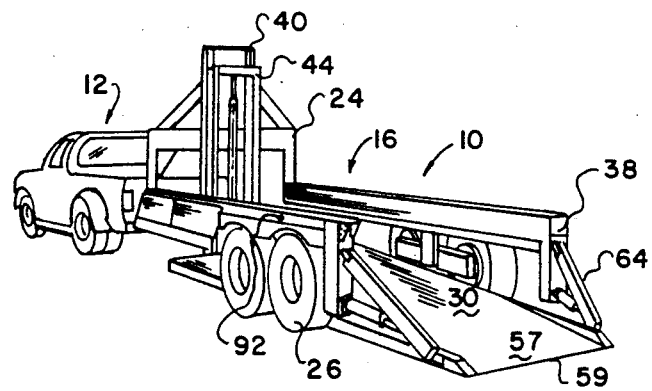
FIG. 2 is similar to FIG. 1 except the bed of the trailer is shown resting upon the ground.
Figure 3:
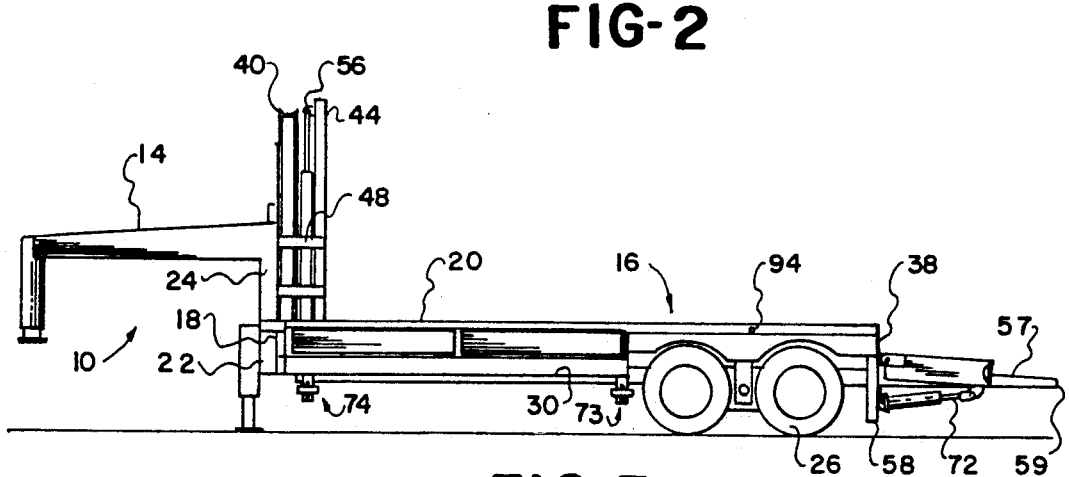
FIG. 3 is a side elevational view of the trailer according to this invention showing the bed at transport position.

Referring to the drawings, FIGS. 1, 2, and 3, there may be seen trailer 10 adapted to be towed by pickup truck 12 by goose-neck hitch 14. The trailer is characterized by U-shaped frame 16 which includes bight 18 of the U at the front of the trailer immediately attached to the goose-neck frame 14 and to arms 20 of the U which extend from the back to the rear.(FIG. 4) Each arm has tandem wheels 26 which are connected by a simple walking beam (not shown).

Inasmuch as goose-neck hitches attached to trailers, including jacks 22 to support the front of the trailer when not attached to a truck are well known in the art and within the skill of ordinary craftsmen, they will not be discussed further here.

Inasmuch as U-shaped frames 16 are not so well known, they will be discussed in more detail. The front of the U-shaped frame has rack 24 to support a mast or guide rail frame 40 which will connect to the front of bed 28 to raise and lower the same.

Figure 6:
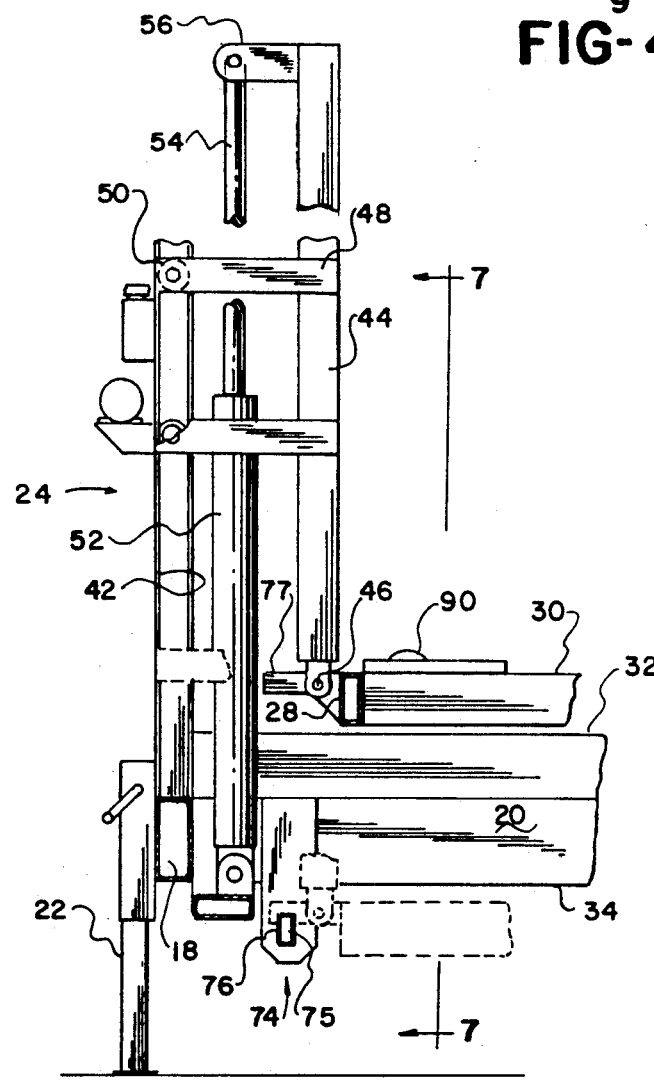
FIG. 6 is a side elevational view of the front portion of the trailer. The bed is shown in an elevated position in full line and in an alternate position in transport position in dotted line.

Referring more particularly to FIG. 3, 6, and 7, there may be seen that from the front of the trailer 10 at the bight 18 in front of the ground engaging wheels 26 that the U-shaped beams can be thick, i.e., from top 32 of the arm 20 to bottom 34 of the arm 20 is a considerable distance. Therefore structural stringer 36 in the top and stringer 37 in the bottom of each arm can be widely separated and braces welded between the stringers to make a structurally strong, rigid arm from the bight 18 to the wheels 26.(FIG. 7) However, because it is desirable not to have the wheels 26 extending outboard of the outer edge of the arms 20, it is necessary at that point to have only the top stringer 36 extend over the wheels to the rear 38 of the arms 20. This design leaves the arms from the wheels 26 to the rear 38 of the arms not as strong and resistent to twisting as the arms forward of the wheels.

Referring to the rack 24 at the bight 18 of the U-shaped frame 16, it may be seen that it is somewhat rectangular in shape, at least as high as the top of the goose-neck hitch 14. Extending vertically from about half-way between the arms at the bight 18, guide rail frame 40 is rigidly attached to the bight 18. This guide rail frame is rectangular in shape and has rails 42 facing outward on each side thereof.(FIG. 6) The guide rails 42 are over 5 feet from top to bottom. Moving frame 44 is pivoted by pivot 46 to the front 28 of the bed 30. Guide arms 48 extend from each side of the moving frame 44 forward and terminate with guide wheels 50 which ride within the guide rails 42. Hydraulic cylinder 52 with piston rod 54 is pivoted to the bight 18 between the guide rail frame 40 and moving frame 44. The piston rod 54 extends upward and attaches to ear 56 by a pivot pin at the top of the moving frame 44. The piston rod 54 has a 5 foot extension or movement within the cylinder 52. Therefore it may be seen by hydraulic actuation of the piston rod within the cylinder that the front of the bed 30 can be moved for a total travel of 5 feet. The guide wheels in the rails 42 will guide the moving frame in its vertical motion. When the bottom guide arm 48 is near the bottom of the rail 42 the bottom of the bed 30 will be resting upon the grounds which support the pickup 12 and the wheels 26. The cylinder is pivoted to the U-frame and to the top of the moving frame so that if there is any movement or strain within the guide rail frame 40 that the piston rod 54 does not bind within the cylinder 52. The moving frame 44 is pivoted to the front of the trailer bed so that the trailer bed 30 can be angled or tilted with respect to the U-frame 16.(FIG. 5)

The rear of the bed 30 extends behind the rear 38 of the arms 20 for a distance of 5 feet or more. The rear of the bed is designated as ramp 57 inasmuch as it is tapered downward so that the forklift may be driven or pulled upon it. The extreme rear of the ramp will be the ramp lip 59 which is no more that about 1 inch in thickness.

Rear structural pendant 58 extends from the rear 38 of each arm 20 downward.(FIG. 10) Bottom or cylinder pivot ear 60 is attached near the bottom of each pendant 58. Top or stiff arm pivot 62 is attached to each of the pendants 58 spaced above the bottom pivot 60. Stiff arm or strut 64 is pivoted to the top pivot 62 and terminates with roller 66 which rolls within bed track 68 on the side of the ramp 57 of the bed 30. Pendant cylinder 70 is pivoted to the bottom pivot 60.(FIG. 9) Piston rod 72 extending from the cylinder 70 is pivoted to the bottom of the stiff arm 64 between the roller 66 and the top pivot 62 as seen in the drawings. Therefore it may be seen that application of hydraulic pressure to the pendant cylinder 70 will cause the roller at the end of stiff arm 64 to rotate about the top pivot 62. At the lower point of the arc through which it moves the bed 30 or at least the ramp lip 59 will be rested upon the ground as previously described for the front of the bed. At the top of the arc through which the roller 66 will move, the bed 30 will be elevated 5 feet above the ground.

The roller 66 will have a back-and-forth movement along the bed track 68 to accommodate the circular movement about the top pivot 62.

Therefore it may be seen that by synchronous movement as between the cylinders 52 and the cylinder 70 that the bed 30 can be raised and lowered with the bed being level. However, if at any point either the cylinder 52 or the cylinders 70 are operated independently, the bed is tilted to any desired position.

Also it will be understood that the bottom of the ramp 57 lies in the same plane as the bottom of the bed 30. However, the top of the bed is angled up so that when the bed is flat upon the ground the ramp lip 59 is on the ground and therefore equipment such as a fork lift may readily be rolled or driven upon the bed. Also, it will be understood that with the front of the bed elevated more than the back of the bed that the lip ramp can also be upon the ground.

When in the travel position the bed 30 is locked rigidly to the arms 20 of the U-frame 16. Front locks 74 as illustrated in FIGS. 6 and 7 are in the form of bars 75 which slide longitudinally in slots 76 attached below the arms at the front of the arms 20 immediately behind the bight 18. The bars 75 lock under lugs 77 on the bed 30. Analysis will show that these locks will exert a turning stress or coupling on the arms 20 at this point. However, inasmuch as the lock at this point is near the bight 18 and the arms are rigidly attached and reinforced to the bight, that this turning motion or coupling will not adversely strain or over-stress the arms at this point.

Midlocks 73, similar to front locks 74 are attached in front of the wheels 26 to the arms 20 to prevent the middle of the bed 30 from flexing during travel.

However, it may be seen that such a lock 74 at the rear of the trailer would exert a serious torque and strain upon the arms 20 particularly since at the rear the locks must be supported by the top stringer 36 from in front of the wheels 26 on rearward to the pendant 58.

Therefore, rear lock 78 includes long bar 80 which slides laterally within guided slot 82 within the bed itself. (FIG. 11) . Therefore if the bar 80 has a notch to rest upon lock ear or lug 84 mounted about halfway between the sides of the pendant 58 at the rear of the trailer, the lock 78 will not exert a coupling or turning motion upon the arm 20 at the rear 38. It is advantageous for the lock ear 84 to be aligned with the ground engaging wheels 26, that is to say that a vertical plane parallel to the direction of travel through the lock ear 84 also passes through the area of ground contact 86 of the ground engaging wheels 26 with the ground. Thus taken as a free body, the arm structure also will not have a turning coupling upon it. As seen, the lock ear 84 is between the top and bottom pivots 62 and 60.

FIG. 13 shows an alternate and preferred form of the rear lock 78. It may be seen that the lock 78 includes two lugs 96 and 98 on the rear of the pendant 58. The lugs will be between the bottom and top pivots 60 and 62. Also, the lugs will be located so that a vertical plane parallel to the direction of travel through either lug 96 or 98 will pass through the area of ground contact 86 and the ground engaging wheel 26. However, analysis will show that this requirement is not so important for the preferred embodiment shown in FIG. 13. Specifically, if the stress on either of the arms 20 were such to cause it to have a torsional strain, it will readily be seen that the torsional strain would cause additional weight or load from the bed 30 to be transferred to the lug 96 (or 98) so that there would be a stress to prevent further torsional strain. Stated otherwise, if the arm were to twist so that the ground engaging tire 26 moved outward from the center of the trailer, lug 96 would move to a higher position and more weight then would be carried by the lug in 96 which is on the outboard side of the pendant so that the weight at that point would resist further twisting of the arm 20. Likewise, if for some reason the strain caused the arm to twist in the opposite direction or counter-clockwise as viewed in FIG. 13, the lug 98 would carry additional load from the bed 30 which would result in a clock-wise stress upon the arm. As may be seen in the illustration, the lugs 98 and 96 are laterally spaced upon the pendant 58 and therefore upon the arm 20. The sliding arm 80 has a notch which cooperates with the lug 96 to prevent it from moving inward or outward and because of the notch, the lug 96 is spaced slightly higher than lug 98. Without any strain upon the trailer the two lugs and 98 will each carry equal load. By one analysis the engagement point as shown in FIG. 13 might be considered to be half way between the two lugs 96 and 98.

Figure 4:
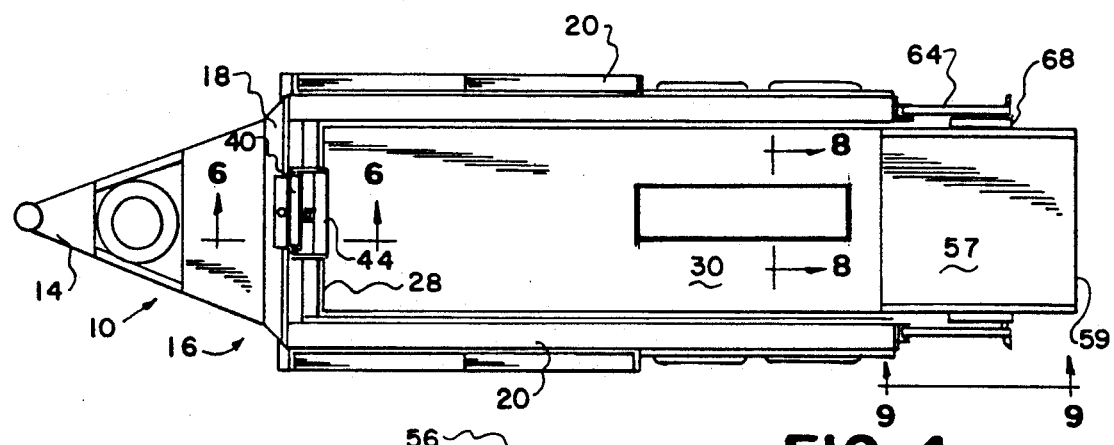
FIG. 4 is a top plan view of the trailer according to this invention.

Referring to FIGS. 4 and 8 it may be seen that removeable panel or trap door 88 is placed in the bed 30. It may be seen that it rests upon structural members. Therefore it may be readily removed and if a forklift is properly placed upon it maintenance operations such as changing motor oil, may be performed upon the forklift while located thereupon.

Cable winch 90 is attached into the bed 30 at the front 28. It is driven by an electric or hydraulic motor. An electric motor is preferred.

An electric motor is mounted upon the goose-neck hitch 14. It is powered by a battery also mounted upon the goose-neck hitch 14. The battery has connections to connect to the electrical system of the towing vehicle to charge it and maintain its charge if it is operated while disconnected. Of course, the battery can be charged from other sources as well. The hydraulic pump pressurizes oil from hydraulic reservoir mounted upon the guide rail frame 40. The hydraulic pump is connected by lines not shown to the hydraulic cylinders and to the hydraulic motor of winch 90. Each of the cylinders and the motor can be operated in either direction by conventional valves or switches. The valves are operated by electrical solenoids and the electric solenoids are controlled by a control panel of six switches 92 mounted upon the top of the pendant 58. Also, the switches can be controlled by a remote control which may be attached to a plug 94 upon the left hand arm 20.

Inasmuch as the components such as remote control cables and control boxes and switches for solenoid valves and electric motor powered hydraulic pumps for the entire hydraulic system are readily available commercially upon the market and the assembly of the various components are well within the skill of ordinary mechanics, the details of such systems are not set out herein.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific example above do not point out what an infringement of this patent would be, but are to enable one skilled in the art to make and use the invention. The limits of the invention and the bounds of the patent protection are measured by and defined in the following claims.

I claim as my invention:

1. A land vehicle having
   a. a U-shaped frame with
      i. two arms, each having a back end,
      ii. a front end,
      iii. a back end, and
      iv. a bight connecting the two arms,
      v. the bight of the U-frame at the front,
   b. ground engaging wheels connected to the arms, having a ground contact area with the ground,
   c. motive means connected to the vehicle at the front of the frame for moving the vehicle in a direction of travel,
   d. a bed in the U-frame,
   e. lifting means interconnecting the frame and bed for vertically moving the bed, and
   f. locks interconnecting the back end of the frame and bed for attaching the bed to the grame in a travel position,
   g. wherein the improvement comprises:
   h. at least one of said locks engaging an arm of the frame at at least one engagement point which is located on the arm so that a vertical plane parallel to the direction of travel through said at least one engagement point passes through the ground contact area of at least one of the wheels.

2. The invention as defined in claim 1 further comprising:
   j. a trap door in the bed for providing access from below the bed to equipment positioned on the bed.

3. The invention as defined in claim 1 wherein said lifting means interconnecting the frame and bed for vertically moving the bed includes:
   j. a frame at the bight of the bed,
   k. vertical guide rails on the frame,
   l. a moving frame attached to the front of the bed, and
   m. guide wheels extending from the moving frame to the guide rails, and
   n. a hydraulic cylinder pivotally attached to the bight, and
   o. a piston rod in the hydraulic cylinder extending to a pivot at the top of the moving frame.

4. The invention as defined in claim 1 wherein:
   j. said motive means is a goose neck hitch.

5. The invention as defined in claim 1 further comprising:
   j. a trap door in the bed for providing access from below the bed to equipment positioned on the bed,
   k. a frame at the bight of the bed,
   l. vertical guide rails on the frame,
   m. a moving frame attached to the front of the bed, and
   n. guide wheels extending from the moving frame to the guide rails, and
   o. a hydraulic cylinder pivotally attached to the bight,
   p. a piston rod in the hydraulic cylinder extending to a pivot at the top of the moving frame,
   q. a pendant having a bottom on the back end of each of the arms,
   r. a bottom pivot on the bottom of each pendant,
   s. a top pivot above the bottom pivot on each pendant,
   t. a cylinder pivotally attached to each bottom pivot,
   u. a stiff arm pivotally attached to each top pivot,
   v. a roller on a distal end of each stiff arm spaced away from the top pivot,
   w. tracks upon each side of the back of the bed,
   x. each stiff arm roller in one of said tracks,
   y. a piston rod in each cylinder of the bottom pivots pivotally attached to the associated stiff arm between the top pivot and the roller thereof,
   z. said motive means being a goose neck hitch.

6. A land vehicle having
   a. a U-shaped frame with
      i. two arms, each having a back end,
      ii. a front end,
      iii. a back end, and
      iv. a bight connecting the two arms,
      v. the bight of the U-frame at the front,
   b. ground engaging wheels connected to the arms, having a ground contact area with the ground,
   c. motive means connected to the vehicle at the front of the frame for moving the vehicle in a direction of travel,
   d. a bed in the U-frame,
   e. lifting means interconnecting the frame and bed for vertically moving the bed, and
   f. locks interconnecting the back end of the frame and bed for attaching the bed to the frame in a travel position,
   g. wherein the improvement comprises:
   h. at least one of said locks engaging an arm of the frame at at least one engagement point which is located on the arm so that a vertical plane through said at least one engagement point passes through the ground contact area of at least one of the wheels, and wherein said lifting means includes
   j. a pendant having a bottom on the back end of each of the arms,
   k. a bottom pivot on the bottom of each pendant,
   l. a top pivot above the bottom pivot on each pendant,
   m. a cylinder pivotally attached to each bottom pivot, a stiff arm pivotally attached to each top pivot, o. a roller on a distal end of each stiff arm spaced away from the top pivot, p. tracks upon each side of the back of the bed, q. each stiff arm roller in one of said tracks, r. a piston rod in each cylinder of the bottom pivots pivotally attached to the associated stiff arm between the top pivot and the roller thereof.

7. A land vehicle having
   a. a U-shaped frame with
      i. two arms, each having a back end,
      ii. a front end,
      iii. a back end, and
      iv. a bight connecting the two arms,
      v. the bight of the U-frame at the front,
   b. ground engaging wheels connected to the arms, having a ground contact area with the ground,
   c. motive means connected to the vehicle at the front of the frame for moving the vehicle in a direction of travel,
   d. a bed in the U-frame,
   e. lifting means interconnecting the frame and bed for vertically moving the bed, and
   f. locks interconnecting the back end of the frame and bed for attaching the bed to the frame in a travel position,
   g. wherein the improvement of one of said locks comprises:
   h. two laterally spaced lugs on the back end of each arm, and
   j. a bar laterally slidable in a slot in the bed so that in an extended position the bar rests upon said lugs.

8. The invention as defined in claim 7 wherein the lifting means interconnecting the frame in the bed for vertically moving the bed includes:
   j. a pendant having a bottom on the back end of one of the arms,
   k. a bottom pivot on the bottom of the pendant,
   l. a top pivot above the bottom pivot on the pendant,
   m. a cylinder pivotally attached to the bottom pivot,
   n. a stiff arm pivotally attached to the top pivot,
   o. a roller on a distal end of the stiff arm spaced away from the top pivot,
   p. tracks upon the back of the bed,
   q. said stiff arm roller in said tracks, and
   r. a piston rod in the cylinder of the bottom pivot pivotally attached to the stiff arm between the top pivot and the roller.

9. The invention as defined in claim 8 further comprising:
   s. a trap door in the bed for providing access from below the bed to equipment positioned on the bed,
   t. a frame at the bight of the bed,
   u. vertical guide rails on the frame,
   v. a moving frame attached to the front of the bed, and
   w. guide wheels extending from the moving frame to the guide rails,
   x. a hydraulic cylinder pivotally attached to the bight,
   y. a piston rod in the hydraulic cylinder extending to a pivot at the top of the moving frame, and
   z. said motive means is a goose neck hitch.

10. The process involving a land vehicle having
    a. a U-shaped frame with
       i. two arms, each having a rear,
       ii. a front end,
       iii. a back end, and
       iv. a bight connecting the two arms,
       v. the bight of the U-frame at the front,
    b. ground engaging wheels connected to the arms, having a ground contact area with the ground,
    c. motive means connected to the vehicle at the front of the frame for moving the vehicle in a direction of travel,
    d. a bed in the U-frame,
    e. lifting means interconnecting the frame and bed for vertically moving the bed, and
    f. locks interconnecting the back end of the frame and bed for attaching the bed to the frame in a travel position,
    g. wherein the improved method comprises:
    h. minimizing torque on the arms of the frame resulting from a load on the bed, by
    j. attaching two laterally spaced lugs to the rear of each of the arms, and
    k. sliding a bar from a slot in the bed to rest on the lugs.

* * * * *